May 22, 1962 W. R. BEALL 3,036,292

READ-OUT SYSTEM

Filed July 13, 1959 3 Sheets-Sheet 1

May 22, 1962 W. R. BEALL 3,036,292

READ-OUT SYSTEM

Filed July 13, 1959 3 Sheets-Sheet 3

United States Patent Office 3,036,292
Patented May 22, 1962

3,036,292
READ-OUT SYSTEM
William R. Beall, Glendale, Calif., assignor to Clary Corporation, San Gabriel, Calif., a corporation of California
Filed July 13, 1959, Ser. No. 826,552
4 Claims. (Cl. 340—172.5)

This invention relates to read-out apparatus for electronic data handling equipment and the like and has particular reference to a read-out apparatus capable of reading out information stored in magnetic cores and similar magnetic elements.

In the co-pending application of R. E. Loudon, S.N. 692,881, filed Oct. 28, 1957, a simple and effective read-out system is disclosed and claimed for reading out and translating information from a counter or other information registering device having coded information in the form of steady state potentials of different values standing on its output terminals. Such apparatus works satisfactorily in cases where information in the form of different potentials is held on the output terminals during the read-out operation. However, in cases where it is desired to read-out of static magnetic information storage elements, such as magnetic cores, problems are encountered because such elements must generally be sensed by altering the magnetic flux thereof. Such alteration must be done at a relatively rapid rate of speed in order to obtain signal pulses of sufficient amplitude to effect reliable control.

A principal object of the present invention is to read-out information from static magnetic information storage devices.

Another object is to provide a simple and yet reliable read-out system for reading out of static magnetic information storage elements.

A more specific object is to provide a relatively simple and inexpensive apparatus to read-out and translate information stored in coded form in a static magnetic core memory unit.

The manner in which the above and other objects of the invention are accomplished will be readily understood on reference to the following specification when read in conjunction with the accompanying drawings, wherein.

Figure 1:
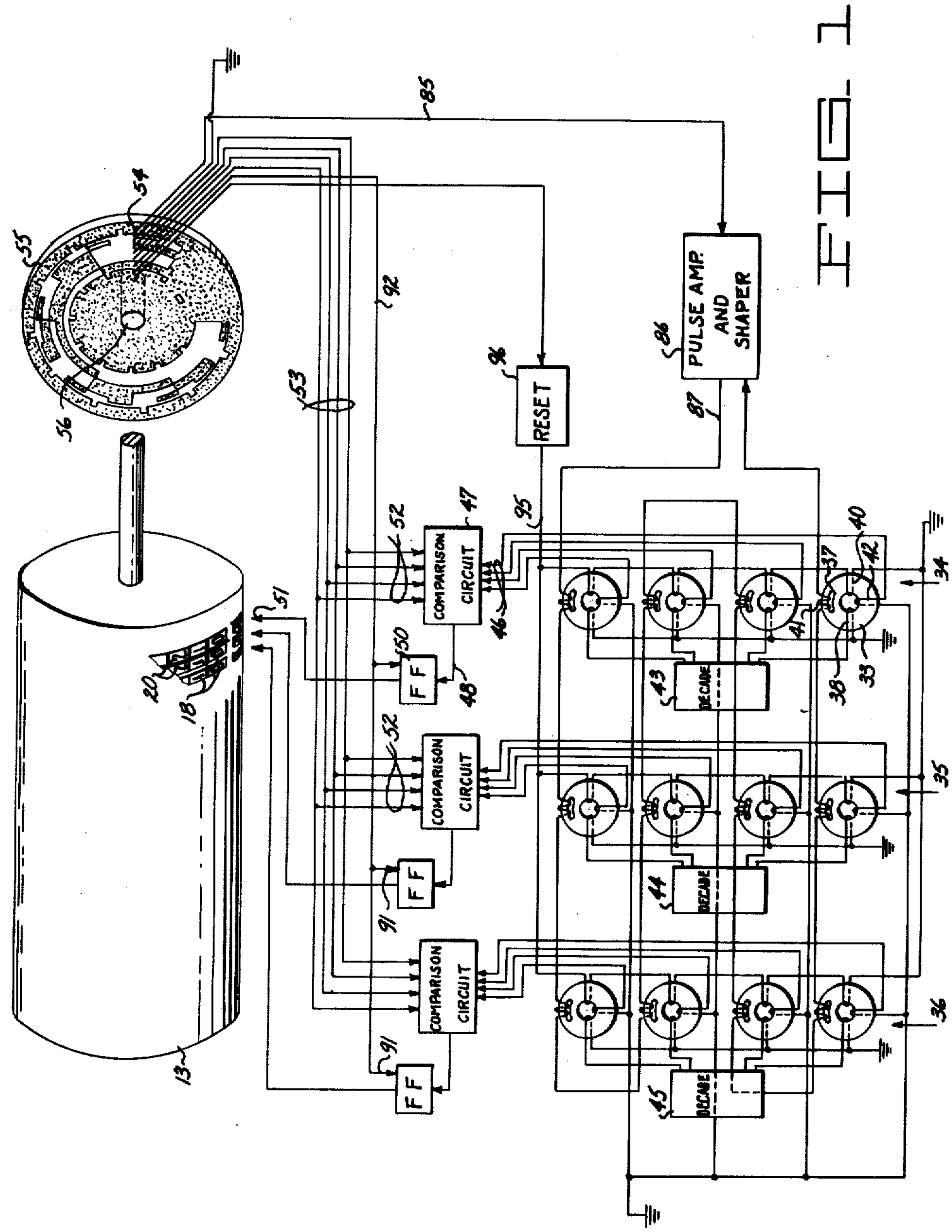
FIG. 1 is a general schematic view illustrating a preferred form of the present invention.

Although the invention may be equally well applied to different types of printing mechanisms, the printing mechanism chosen for illustration herein is disclosed and claimed in different aspects in the co-pending applications of E. O. Witt el al., S.N. 770,719 filed on October 30, 1958, now U.S. Patent No. 2,915,968, and C. A. Christoff et al., S.N. 787,543 filed on January 19, 1959, now U.S. Patent No. 2,910,936. Therefore, only a general description of such printing mechanism will be given herein and reference may be had to the above co-pending applications for a complete understanding thereof.

The printing mechanism comprises a rotatable drive shaft 11 (FIG. 4) rotatably mounted in bearings not shown. The shaft has eccentric bearing portions 12 which rotatably support a printing drum 13 through ball bearings 14. An external gear 15 is fixed on the drum concentric therewith and meshes with an internal gear 16 arranged concentrically of the shaft 11 and suitably secured in a frame section 17.

Figure 4:
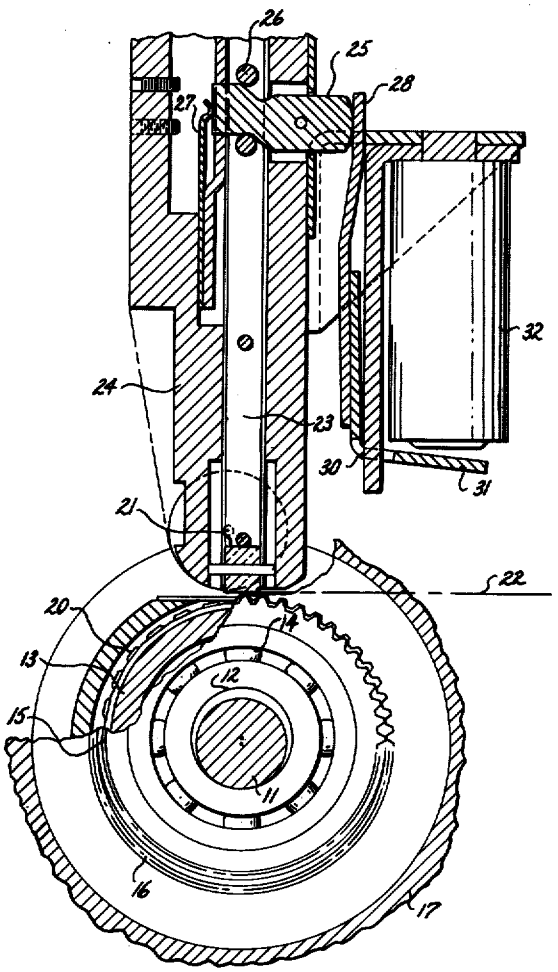
FIG. 4 is a transverse sectional view through part of a digit recording device chosen for illustration in connection with the present invention.

The printing drum 13 has a plurality of rows 18 (FIG. 1) of type printing characters extending therearound as indicated in FIG. 1, each row containing digit type characters 20, FIG. 4, ranging in value from 0 to 9.

The printing drum 13 is divided into a number of type characters spaced therearound and the number of external teeth on the gear 15 is equal to such number or to an equal integral multiple thereof. The internal gear 16 contains the same number of teeth plus one or plus such multiple number of teeth so that upon each rotation of the shaft 11 and consequent orbital movement of the printing drum 13 about the center of the shaft 11, the drum will creep from one type character space to the next relative to a printing station established by a row of platens, one of which is shown at 21, there being one such platen for each row 18 of type characters. The platens 21 are located in a line extending parallel to the axis of the shaft 11.

The various type characters are substantially aligned with the pitch diameter of the gear 15 as shown in FIG. 4. Accordingly, as the type drum center moves in an orbit about the center of the internal gear 16 a part of each type character will describe a hypocycloidal curve so that as each type character reaches the apex of its outward travel, it will be moving substantially radially outward. If at this time a printing platen 21 has been positioned inwardly toward the type drum 13 against a paper strip 22, printing contact will occur to transfer a printing impression from the type character to the paper. Suitable means (not shown) is provided to apply ink to the type characters.

Describing now the means for positioning the platens 21 in and out of printing position, such platens are located in side by side relation and are fixed in slides 23 which are guided for longitudinal movement in slots formed in a stationary guide block 24.

Cam bars 25 extend between side rails forming the slides 23 and have camming surfaces thereon cooperable, in each case, with a pair of pins 26 attached to the slide whereby to raise and lower the respective platen. Normally, the cam bars are held inward as shown in FIG. 4 by leaf springs 27 suitably attached to the guide block. The right-hand ends of the cam bars 25 engage arms 28 pivotally supported at 30 and provided with tabs 31 forming armatures cooperable with respective electromagnets 32.

Energization of a magnet 32 will rock its associated arm 28 counterclockwise, thereby actuating its cam bar 25 to lower the respective platen into printing position relative to the aligned row of type characters on the printing drum.

According to the present invention, means are provided for selecting and timing the positioning of the various type platens 21 in printing positions so as to selectively print amounts registered on a memory unit comprising an array of magnetic core elements 33, FIG. 1. The latter are arranged in groups of four to register a combinational unit code i.e., the binary coded decimal code. The right-hand group 34 of cores represents the units denomination and the cores therein represent counting from the bottom, the weighted values of "1," "2," "4" and "8." In a similar manner, the next group 35 of cores represents the tens denomination and the left-hand group 36 represents the hundreds denomination. Although only three denominations are illustrated, it will be obvious that this number can be expanded to any reasonable amount.

The cores 33 are of a type such that information may be obtained therefrom without destroying the registration on the cores. Although various types of cores and core reading circuits are available in which a non-destructive read-out of information may be obtained, the particular cores chosen for illustration in connection with the present invention are disclosed in the patent to Lane, No. 2,874,374 issued on February 17, 1959. In this type, each core is shaped generally in the form of a toroid having an arcuate slot 37 located intermediate its inner and outer peripheries. Each core is provided with a "set" winding 38, a reset winding 40, an interrogating winding 41 and a read-out winding 42.

The cores are formed of a magnetic material preferably having a substantially rectangular hysteresis loop characteristic. When a pulse of sufficient amplitude is applied to the set winding 38, the core is driven to a binary "1" indicating state which for purposes of discussion will be considered as a positive magnetic remanent state, if it is not already in such state. The core will thereafter remain in such state until reversed by application of a pulse in the appropriate direction to the reset winding 40. Application of a pulse to the reset winding will drive the core to a negative magnetic remanent state representing the binary "0." Application of an interrogating pulse in the appropriate direction to the winding 41 will establish a flux about the arcuate slot 37 which will, in effect, increase the reluctance to the magnetic flux extending around the core. If the core is standing at "1," the resultant action will be ineffective to reverse the main flux around the core but will momentarily reduce the same sufficiently to induce a signal in the read-out coil 42 indicating that the core registers a binary 1. If the core is standing at binary "0" the interrogating pulse will be ineffective to induce a read-out signal of appreciable magnitude in the coil 42.

For purposes of illustration, the cores are shown as forming a buffer memory unit wherein the "set" windings 38 of the different cores are connected to the outputs of decade units 43, 44, and 45 forming the different denominational decades of a binary coded decimal counter register. An example of such a counting register circuit may be found in the patent issued to F. Schwend, No. 2,767,907 on October 23, 1956, wherein four bi-stable stages are interconnected to operate as one decade of a counter register.

The read-out windings 42 of the various cores associated with each decade are connected through a group of lines, i.e., 46, to an associated comparison circuit 47, there being a comparison circuit for each denominational group of cores. The output 48 of each comparison circuit is connected through a flip-flop circuit 50 to a printer selector magnet energizing circuit, indicated generally in FIG. 1 by an arrow 51, effective to cause energization of an electromagnet 32 (FIG. 4) in the corresponding denominational order of the printer.

An additional group of lines 52 is connected to each comparison circuit 47. The groups of input lines 52 are connected in parallel to a group of trunk lines 53 which, in turn, are connected to respective ones of a group of stationary brushes 54 associated with a commutator disc 55.

The commutator disc 55 is carried by a shaft 56 and is formed of insulating material having concentrically arranged signal contacts 55*a* formed thereon (see also FIG. 2) arranged to pass under respective ones of the brushes 54.

Figure 2:
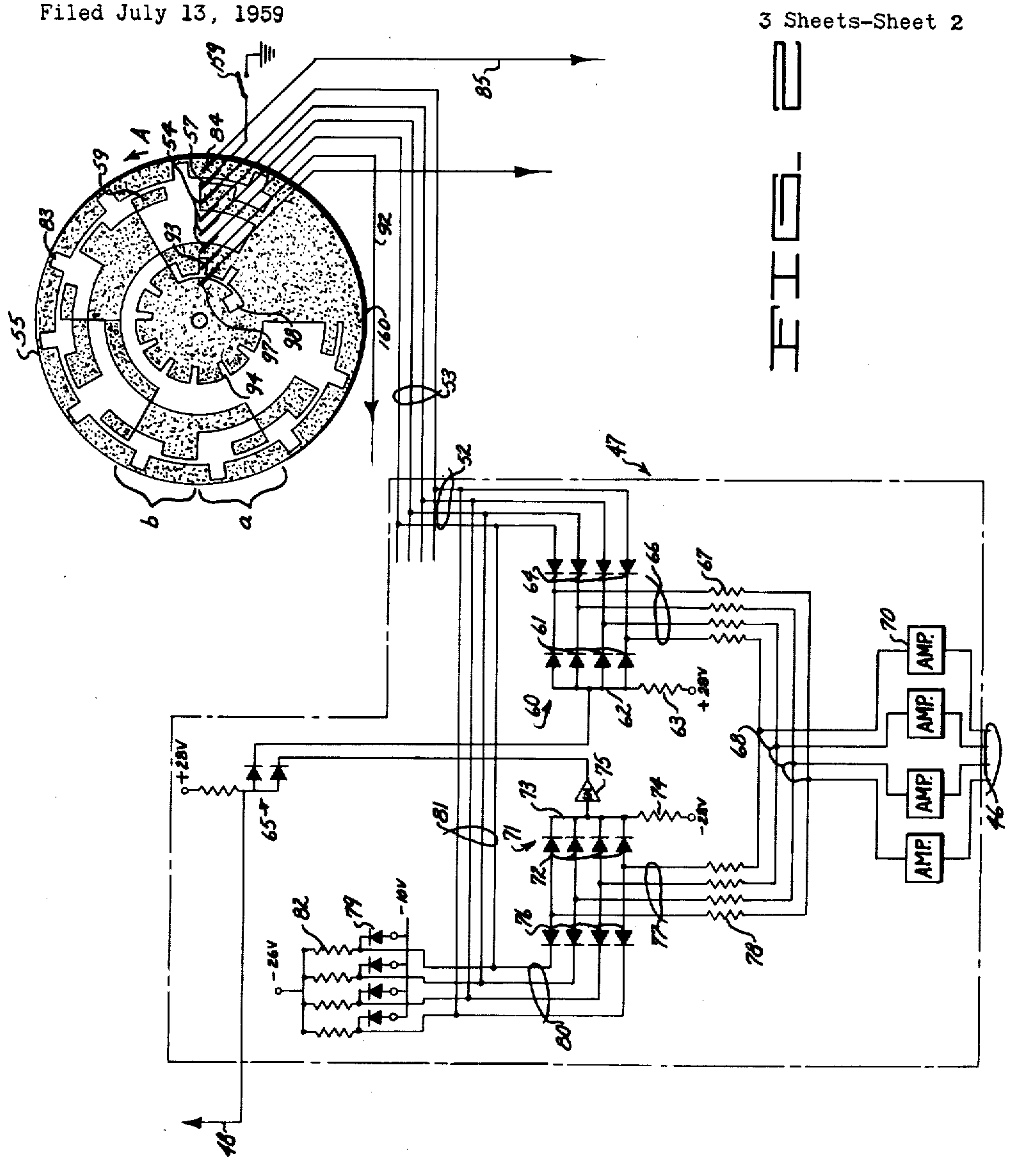
FIG. 2 is a detailed schematic view illustrating one denominational unit of the apparatus associated with the translating and timing commutator.

As set forth in the above co-pending patent applications, the commutator disc 55 is operatively connected to the printing drum 13 in such a manner that it advances its contacts from one contact section, i.e., section *a* of FIG. 2, to the next section, i.e., section *b*, as the drum advances from one type character space to the next.

Referring to FIG. 2, all of the various contacts on the disc 55 are electrically connected together and an outer concentric section 59 thereof is in wiping contact with a brush 57 connected through a settable switch 159 to ground which, in this case, represents a relatively high potential. Accordingly, as the commutator disc 55 rotates in the direction of the arrow A in time with the rotation of the type drum 13, a relatively high potential is applied to different combinations of lines 52 depending on the configuration of the contacts passing the brushes 54. These contacts are so arranged in location and combination relative to the printing drum that the combination of ground potentials applied to the lines 52 at any one time represent the complement of a combinational code corresponding to a particular numeral digit type character about to pass under the platens 21 at that time.

As will be described in detail presently, when a combination of ground potentials on a group of lines 52 complement a group of read-out pulses derived from the associated denominational group of cores 33, an output pulse will be applied on line 48 to position an associated platen 21 in printing position so that a digit corresponding to that registered in binary form by the associated counter decade will be printed.

It will be noted that all duplicate type characters in the different circumferential rows 18 of the type drum are in line with each other in a direction parallel to the axis of the drum. Therefore, all duplicate digits in different denominations of the printer will be printed concurrently.

FIG. 2 illustrates the comparison circuit 47 for controlling the units order platen selector magnet from the units denominational group of cores 33, it being understood that the details of the remaining comparisons circuit are similar.

An "and" gate 60 for high potentials is provided, comprising four diodes 61 having their anodes connected to a common line 62 which, in turn, is connected through a resistance 63 of relatively high ohmic value to a source of +28 volts. The line 62 is also connected to an upper input diode of an "and" gate 65 for high potentials. The diodes 61 are connected through diodes 64 to respective ones of the lines 52. In this case, the cathodes of the diodes 61 are directly connected to the cathodes of the diodes 64 and also through lines 66, dropping resistors 67, points 68, and pulse amplifiers 70 to the aforementioned lines 46 which it will be recalled, are connected to the read-out windings of the cores 33 in the corresponding denomination.

An "and" gate 71 for low potentials is also provided in the comparison circuit and comprises four input diodes 72 having their cathodes connected to a common line 73. The latter is connected through a resistor 74 to a source of −28 volts supply. The line 73 is also connected through a potential inverter 75 to the lower input diode of the gate 65.

The input diodes 72 have their anodes connected to the anodes of a set of diodes 76 and, through lines 77 and dropping resistors 78, to the pulse amplifiers 70.

The cathodes of the diodes 76 are connected through lines 80 and 81 to respective ones of the aforementioned lines 52. Also, the cathodes of diodes 76 are connected through lines 80 and dropping resistors 82 to a source of −26 volt potential. Clamping diodes 79 are connected between the lines 80 and a source of −10 volt supply to clamp the potential of lines 80 at −10 volts.

In operation, it will be noted that a negative potential will normally be applied through the lines 80 to diodes 76 and through lines 81 to diodes 64.

When a combination of relatively positive (ground) potentials derived from the commutator contacts complement the positive potentials derived from the outputs of the amplifiers 70, the and gate 60 will operate to apply a positive potential to the upper diode of the and gate 65. Also, when such combination of ground potentials is applied to the lines 80, all of the outputs of the gate 71 will be held at low potential to cause this gate to apply a negative potential to the inverter 75. The inverter will therefore pass a high potential to the lower input of the gate 65, and since the upper input diode of this gate is concurrently held at high potential, a relatively high potential will be developed in the printer magnet control line 48.

It will be noted that the potentials derived from the commutator disc 55 and applied over lines 52 must be received by the comparison circuits concurrently with the reception of pulses derived from the memory cores 33 in order to properly energize the associated printer selecting magnets 32. Read-out pulses derived from such cores must of necessity be of relatively short duration in order to develop a sufficiently high amplitude to insure proper control.

According to the present invention, the need for precise timing of the pulses or potentials on lines 52 and the pulses from the read-out windings of the cores 33 is eliminated. For this purpose, an outer row of contacts 83 is formed on the commutator disc 55. Such contacts are electrically connected to the remaining contacts and are in wiping contact with a brush 84 connected through a line 85 (see also FIG. 1) and a pulse amplifying and shaping circuit 86 to a line 87 connected in series with the various interrogating windings 41 of the different cores 33.

Figure 3:
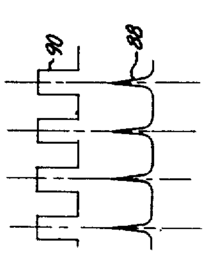
FIG. 3 is a schematic view illustrating the relationship of certain of the wave forms developed by the apparatus.

The pulse amplifying and shaping circuit 86, which may be of any construction well known in the art is arranged to amplify and shape the wave form of the potentials received from the contacts 83 to provide spaced sharply peaked pulses 88, FIG. 3, to the interrogating lines. The arrangement of the contacts 83 and brush 84 relative to the remaining contacts and brushes associated with the commutator disc 55 is such that the pulses 88 occur midway between transmission of high potentials over the lines 52, as indicated by the wave forms 90 in FIG. 3. Thus, sufficient tolerance is permitted to allow the pulses 88 to either lead or lag their theoretical timing by considerable amounts while still remaining within the bounds presented by the wave forms 90.

In operating the apparatus and considering the printing drum 13 and commutator disc 55 to be continuous rotating in proper timed relationship with each other, the switch 159 is closed at an appropriate point preferably at point 160, in the rotation of the drum and commutator. As different sets of contacts on the commutator disc pass brushes 54, different combinations of potentials are applied to the various lines 52 of the different comparison circuits concurrently with application of interrogating pulses to the windings 41 of the various cores 33 by means of the contacts 83 and pulse amplifier and shaper circuits 86. When a combination of such pulses over lines 52 complement the pulses derived from the read-out windings 42 of the cores in the associated decade unit, an output pulse will be developed in the associated comparison circuit output line 48 to effect energization of the associated selecting magnet 32 to cause printing by the approaching type character.

Reset lines 91 associated with the various flip-flops 50 are connected through the common line 92 to a brush 93 which is in wiping engagement with spaced contacts 94 on the commutator disc 55, which contacts are electrically connected to the remaining contacts of the disc. Thus, as each type character passes past the printing point, a reset pulse will be applied to each of the various flip-flops 50 to return the same to set condition if they have been reset by transmission of a pulse through to the magnet selecting circuits 51, thereby preventing unwanted printing by type characters succeding a selected type character.

At the end of a single revolution of the type drum and after all the information is read out of the cores and is printed, the cores are preferably reset to binary zero condition preparatory to receiving new information from the counter. For this purpose, reset windings 40 are connected through line 95 and reset pulse amplifier 96 to a brush 97 located in wiping contact with a single contact 98 also carried by the commutator disc 55 and electrically connected to the remaining contacts of the disc. Thus, near the end of a print cycle a reset pulse is applied to all of the cores 33 to reset all such cores which had previously registered a binary "1."

The cycle control circuit disclosed in the co-pending application of Robert E. Loudon et al., Ser. No. 781,153, filed December 17, 1958, may be embodied in the circuit in the present invention to initiate a print cycle at the appropriate point in the revolution of the printing drum and to terminate the same after a complete revolution thereof.

Although I have described my invention in detail, and have therefore used certain specific terms and languages herein, it is to be understood that the present disclosure is illustrative rather than restrictive and that changes and modifications may be made without departing from the spirit or scope of the invention as set forth in the appended claims. For example, the apparatus may be readily modified to translate and record information registered in different codes by substituting a commutator disc having an appropriate pattern of contacts for the commutator disc 55.

Having thus described the invention, what I desire to secure by United States Letters Patent is:

1. A read-out system for an apparatus having a plurality of static magnetic memory elements for indicating different values by registering different magnetic remanent states comprising the combination of a recording device movable into different character recording positions, means for advancing said recording device through said recording positions, a first set of contacts arranged in patterns in accordance with different possible combinations of said states, a second set of contacts, a carrier for said sets of contacts, a first scanning device effective to emit pulses upon scanning said first set of contacts, a second scanning device effective to emit pulses upon scanning said second set of contacts, means for causing relative scanning movement between said carrier and said scanning devices in synchronism with said recording device, said second set of contacts each being so positioned relative to corresponding patterns of said first set of contacts as to cause said second scanning device to emit pulses within the time periods of respective pulses emitted by said first scanning device, means for causing said second scanning device to interrogate said memory elements, and means responsive to said second scanning device upon interrogating a combination of said memory elements registering a value represented by a pattern of said first set of contacts being scanned by said first scanning device for actuating said recording device, said first set of contacts being of sufficient length in the direction of scanning movement to cause said first scanning device to emit pulses longer than the duration of interrogation of said memory units.

2. A read-out system for an apparatus having a plurality of static magnetic memory elements for indicating different values by registering different magnetic remanent states comprising the combination of a recording device movable into different character recording positions, means for advancing said recording device through said recording positions, a first set of signal elements arranged in patterns in accordance with different possible combinations of said states, a second set of signal elements, a carrier for said contacts, a first scanning device effective to emit pulses upon scanning said first set of signal elements, a second scanning device effective to emit pulses upon scanning said second set of signal elements, means for moving said carrier relative to said scanning devices in synchronism with said recording device, said second set of signal elements having pulse controlling edges thereof so spaced relative to corresponding patterns of said first set of signal elements as to cause said second scanning device to emit pulses within the time periods of respective pulses emitted by said first scanning device, means for causing said second scanning device to interrogate said magnetic elements, and means responsive to said second scanning device upon interrogating a combination of said memory elements registering a value corresponding to a value represented by a pattern of said first set of contacts being scanned by said first scanning device for actuating said recording device, said first set of signal elements being of sufficient length in the direction of scanning movement to cause said first scanning device to emit pulses longer than the duration of interrogation of said memory elements.

3. A read-out system for an apparatus having a plurality of magnetic cores for indicating different values by registering different magnetic remanent states comprising the combination of a recording device movable into different character recording positions, means for advancing said recording device through said recording positions, a first set of signal elements arranged in patterns in accordance with the different possible combinations of said states, a second set of signal elements, a rotatable carrier for said signal elements, a first scanning device effective to emit pulses upon scanning said first set of contacts, a second scanning device effective to emit pulses upon scanning said second set of signal elements, means for rotating said carrier relative to said scanning devices in synchronism with said recording device, said second set of signal elements having pulse controlling edges thereof so positioned relative to corresponding patterns of said first set of signal elements as to cause said second scanning device to emit pulses within the time periods of respective pulses emitted by said first scanning device, means for causing said second scanning device to interrogate said cores, and means responsive to said second scanning device upon interrogating a combination of said cores registering a value represented by a pattern of said first set of contacts being scanned by said first scanning device for actuating said recording device, said first set of signal elements being of sufficient length in the direction of scanning movement to caues said first scanning device to emit pulses longer than the duration of interrogation of said cores.

4. A read-out system for an apparatus having a plurality of static magnetic memory elements for indicating different values by registering different magnetic remanent states comprising the combination of a recording device movable into different character recording positions, means for advancing said recording device through said recording positions, a first set of signal elements arranged in patterns in accordance with different possible combinations of said states, a second set of signal elements, a reset signal element, a rotatable carrier for said signal elements, a first scanning device effective to emit pulses upon scanning said first set of signal elements, a second scanning device effective to emit pulses upon scanning said second set of signal elements, a third scanning device effective to emit a pulse upon scanning said reset signal element, means for rotating said carrier relative to said scanning devices, said second set of signal elements being so positioned relative to corresponding patterns of said first set of signal elements as to cause said second scanning device to emit pulses within the time periods of respective pulses emitted by said first scanning device, means for causing said second scanning device to interrogate said memory elements, means responsive to said second scanning device upon interrogating a combination of said signal elements registering a value represented by a pattern of said first set of signal elements being scanned by said first scanning device for actuating said recording device, said first set of signal elements being of sufficient length in the direction of scanning movement to cause said first scanning device to emit pulses longer than the duration of interrogation of said memory elements, a bi-stable device settable in a first condition for rendering said last mentioned means effective and settable in a second condition for rendering said last mentioned means ineffective, means responsive to said last mentioned means upon operation thereof for setting said bi-stable device in said first condition, and means responsive to said third scanning device upon scanning said resetting signal element for setting said bi-stable device in said second condition.

References Cited in the file of this patent

UNITED STATES PATENTS

| | | |
|---|---|---|
| 2,850,566 | Nelson | Sept. 2, 1958 |
| 2,895,124 | Harris | July 14, 1959 |
| 2,901,540 | Canepa | Aug. 25, 1959 |
| 2,919,967 | Schwertz | Jan. 5, 1960 |